(12) United States Patent
Nelson et al.

(10) Patent No.: US 10,718,458 B2
(45) Date of Patent: Jul. 21, 2020

(54) AUTOMATED PRESSURE EQUALIZATION ABOVE AND BELOW COMPLETION PLUG OF GATE VALVE CARTRIDGE OR A COMPLETION PLUG OF A LINE STOP FITTING

(71) Applicant: Hydra-Stop LLC, Burr Ridge, IL (US)

(72) Inventors: Andrew J. Nelson, Chicago, IL (US); Christopher C. Vazzana, Palos Park, IL (US); Cole Strickland, Chicago, IL (US); Carl Mastny, Crete, IL (US)

(73) Assignee: Hydra-Stop LLC, Burr Ridge, IL (US)

( * ) Notice: Subject to any disclaimer, the term of this patent is extended or adjusted under 35 U.S.C. 154(b) by 44 days.

(21) Appl. No.: 15/950,634

(22) Filed: Apr. 11, 2018

(65) Prior Publication Data

US 2019/0316723 A1    Oct. 17, 2019

(51) Int. Cl.
| | | |
|---|---|---|
| *F16L 55/105* | (2006.01) | |
| *F16L 55/18* | (2006.01) | |
| *F16L 41/06* | (2006.01) | |

(52) U.S. Cl.
CPC ............ *F16L 55/105* (2013.01); *F16L 41/06* (2013.01); *F16L 55/18* (2013.01)

(58) Field of Classification Search
USPC ........................................................ 137/15.2
See application file for complete search history.

(56) References Cited

U.S. PATENT DOCUMENTS

| | | | | |
|---|---|---|---|---|
| 3,070,129 A | * | 12/1962 | Poulallion | F16L 55/136 138/89 |
| 3,766,947 A | * | 10/1973 | Osburn | F16K 51/00 138/89 |
| 4,144,909 A | * | 3/1979 | Harrison | F16L 55/11 138/89 |
| 6,810,903 B1 | * | 11/2004 | Murphy | F16L 55/105 137/315.41 |
| 8,627,843 B2 | | 1/2014 | Ries | |
| 9,091,382 B2 | * | 7/2015 | Gresh | F16L 41/04 |
| 9,644,779 B2 | * | 5/2017 | Vazzana | F16L 55/11 |

* cited by examiner

*Primary Examiner* — John Fox
(74) *Attorney, Agent, or Firm* — Miller, Matthias & Hull LLP

(57) ABSTRACT

A gate valve cartridge, valve housing and installation assembly as well as a completion plug for a line stop fitting and installation assembly. The gate valve cartridge comprises a gate, a paddle, a threaded valve stem and a completion plug. Both completion plugs include an outer circumferential slot for accommodating a circumferential seal and both completion plugs also accommodate a normally-closed check valve. The check valves have an open distal end for receiving a check valve actuator and an open proximal end in communication with fluid disposed proximally of the circumferential seal.

20 Claims, 8 Drawing Sheets

AUTOMATED PRESSURE EQUALIZATION ABOVE AND BELOW COMPLETION PLUG OF GATE VALVE CARTRIDGE OR A COMPLETION PLUG OF A LINE STOP FITTING

BACKGROUND

Technical Field

This disclosure relates generally to valves and line stops for shutting off flow in pressurized pipes or conduits. More specifically, this disclosure relates to gate valve cartridges and line stops that are installable on a pressurized pipe without shutting off pressure to the pipe during installation. Still more specifically, this disclosure relates to improvements in the designs of completion plugs that form a part of a gate valve cartridge including a mechanism for equalizing the pressure above the cartridge and within the installation housing to the pressure of the pipe during installation of the gate valve cartridge. Finally, this disclosure also relates to an analogous completion plug for a line stop fitting that includes a mechanism for equalizing the pressure above the completion plug and within the installation housing to the pressure of the pipe during installation of the completion plug.

Description of the Related Art

Pressurized conduits or pipes convey fluids, both liquid and gas, in municipalities, industrial plants and commercial installations. When originally installed, a network of pipes typically includes strategically located isolation valves or block valves, which are used to isolate certain downstream sections of the pipe for repairs, relocation, installation of new components into the pipe, etc. However, when a repair or maintenance of a pipe of a municipal water system is required, inoperable or far spread isolation valves may require shut down to a large network of pipes resulting in inconvenience to residents, schools, hospitals, commercial and/or industrial facilities.

The length of pipe or network of pipes of a water system that needs to be isolated in the case of a repair or other activity can be shortened and fewer people inconvenienced by adding additional valves, in conjunction with the preexisting block valves. Commonly assigned U.S. Pat. Nos. 8,627,843 and 9,644,779 disclose methods of installing additional gate valves in pressurized pipes that do not require service interruption and result in minimal fluid or pressure loss. The additional gate valves connect to the pipe as an assembly using a permanent housing known as a valve housing that is sealably clamped to the pipe and normally extends upward. A temporary gate valve is sealably mounted on the open top of the valve housing (i.e., the distal end of the valve housing). One or more "tap" or installation housings and a tapping machine are mounted on top (distal end) of the temporary gate valve for delivering a cutting device through the temporary gate valve to the proximal end of the valve housing to cut a hole or "coupon" in the exposed pipe. After removal of the cutting device and closure of the temporary gate valve, the same or similar installation housings are mounted on the distal end of the temporary gate valve for delivering the gate valve cartridge through the temporary gate valve and to the interior of the valve housing, where it is housed while in the open position. This procedure is accomplished without depressurizing the pipe.

Instead of adding a gate valve to a pipe that may remain as a permanent fixture as disclosed in the '843 and '779 patents, sometimes all that is desired is to stop the flow through the pipe just upstream of a repair or maintenance location without installing a gate valve. In this case, a line stop is used to temporarily isolate the pipe at or upstream of the site of the repair or maintenance, while keeping the remainder of the system in operation. Similar to the '843 and '779 patents, commonly assigned U.S. Pat, No. 6,810,903 discloses a system that includes the use of a line stop fitting mounted to the pipe and a temporary gate valve mounted on top of the line stop fitting. Using appropriate housings and a tapping machine mounted on top of the temporary gate valve, a cutting device is inserted through the temporary gate valve to cut an opening in the pipe. After removal of the cutting device and closure of the temporary gate valve, a pump and ram with a housing are used to insert a line stop through the temporary gate valve and line stop fitting and into the pipe temporarily (see FIGS. 1-16 of the '903 patent) to stop the flow through the pipe. After a temporary line stop is withdrawn through the temporary gate valve, a completion plug is inserted through the temporary gate valve and into the line stop fitting to seal the line stop fitting so the temporary gate valve may be removed (see FIG. 16 of the '903 patent).

For more details of the above procedures, see the exemplary systems disclosed in the '843, and '779 patents and the systems disclosed in the '903 patent as well as the systems disclosed at https://www.hydra-stop.com/ (hereinafter, the "Hydra-Stop" installation systems, etc.). One advantage provided by the Hydra-Stop installation systems is that only a small portion of the cross-section of the pipe (i.e., the "coupon") needs to be removed to install the added gate valve cartridge or line stop. As a result, the pipe continuity is maintained. In contrast, installation of other currently available added valves requires closure of the block valve and removal of an entire section of pipe. Another advantage to the Hydra-Stop installation systems is that the gate valves may be installed without stopping flow through the pipe and, hence, without inconveniencing customers. Similarly, the Hydra-Stop installation systems enable line stops to be installed without depressurizing the pipe or shutting off flow upstream of the line stop location, thereby inconveniencing as few customers as possible.

The Hydra-Stop gate valve assemblies include a sealing mechanism disposed on the cartridge or more specifically, on the completion plug ('779 patent) that engages an interior surface of the valve housing as the cartridge is moved proximally (downward) toward the pipe during installation. Prior to effectuating the seal between cartridge and the valve housing as the cartridge is being installed, fluid from the pipe fills the valve housing and the sealed installation housing, thereby balancing the pressure between the pipe, valve housing and installation housing. However, as the cartridge moves proximally towards the pipe, the seal on the completion plug ('779 patent) of the cartridge sealably engages an interior surface of the valve housing. As a result, the seal prevents any additional fluid from passing from the pipe distally (upward) to the installation housing and equipment above the seal. Any further proximal (downward) movement causes the pressure of the water above the seal to drop while the pressure of the pipe below the seal remains high. The same phenomenon occurs within a line stop fitting when a completion plug is installed in the line stop fitting following removal of a temporary line stop (see FIG. 16 of the '903 patent).

As a result of this pressure differential, the gate valve cartridge and/or completion plug and/or permanent line stop can no longer be moved proximally by hand and installers resort to pressurizing the zone above the seal with an external equalization source in order to re-balance the pressure above and below the seal so that the cartridge and/or completion plug and/or permanent line stop can be moved proximally farther into the valve housing and/or line stop fitting. External equalization sources can be expensive and typically do not have regulating systems in place to adequately control the level of pressure being supplied. If used improperly, installers can create a large positive pressure differential above the seal. This can damage or destroy the cartridge or the completion plug by causing it to extend proximally beyond the intended landing surface in the valve housing and/or line stop fitting. Therefore, there is a need for an improved gate valve cartridge and installation assembly and/or completion plug and installation assembly with pressure equalization capabilities within a closed valve housing/installation housing and/or line stop fitting/installation housing so the cartridge and/or completion plug may be moved distally and proximally without undue hindrance caused by a pressure differential and without resorting to an outside pressure source. Accordingly, a need exists for improved gate valve assemblies and line stops for installation in pressurized pipes that address this problem.

SUMMARY OF THE DISCLOSURE

A gate valve cartridge for installation and use on a pressurized pipe in combination with a valve housing and an installation assembly are disclosed. The valve housing may sometimes be referred to as a nozzle. In an embodiment, the cartridge comprises a gate (sometimes referred to as a bullet) comprising a distal end connected to a proximal end, a paddle, a completion plug that may initially engage the distal end of the gate during installation of the cartridge into the valve housing, a stem nut fixedly disposed within the gate and a threaded valve stem. A valve stem channel extends through the completion plug and the distal end of the gate before terminating between the proximal and distal ends of the gate. The valve stem channel is not threaded; however, the gate fixedly connects to the stem nut that is threaded and axially aligned with the valve stem channel. The threaded valve stem threadably passes through the stem nut. Initial rotation of the threaded valve stem prior to installation causes the completion plug and gate to move proximally together until the completion plug becomes seated within the valve housing. The threaded valve stem also includes a distal end disposed distally of the completion plug. The distal end of the threaded valve stem threadably couples to an inner gut rod of the insertion tool. The insertion tool further comprises an outer tube that may be coupled to a check valve actuator or, as an alternative embodiment, a rod-like actuator may be employed that passes through a sealed orifice in the tapping machine housing to open the check valve.

In an embodiment, the completion plug of the gate valve cartridge comprises an outer circumferential slot for accommodating a circumferential seal. The completion plug also accommodates a normally-closed check valve. The check valve has an open distal end for receiving the check valve actuator and an open proximal end in communication with fluid disposed below or proximally of the completion plug or the seal. In an embodiment, a fluid channel extends radially outward from the check valve to a sidewall portion of the gate and/or completion plug disposed proximally of or below the circumferential seal. For reasons described below, the check valve actuator opens the check valve during installation of the cartridge into the valve housing, but the check valve remains closed after installation of the cartridge in the valve housing and after the completion plug is fixed in place at the distal end of the valve housing.

In an embodiment, the valve housing includes a plurality of internal diameters that are wider than the distal and proximal ends of the gate thereby permitting fluid from the pipe to migrate distally from the pipe and annularly between the gate and the interior surface of the valve housing and above the completion plug before the circumferential seal of the completion plug is moved into sealing engagement with the interior surface of the valve housing.

In an embodiment, a distal end of the gate comprises a plurality of fluid channels providing communication from the annular space between the gate and the interior surface of the valve housing to the check valve and vice versa. In a refinement of this concept, the completion plug includes a proximal surface that engages the distal end of the gate and forms the plurality of fluid channels with the distal end of the gate during installation of the cartridge into the valve housing. The completion plug also includes a distal surface that faces away from the gate and a sidewall portion disposed between the proximal and distal surfaces of the completion plug. The sidewall portion of the completion plug includes a circumferential slot that accommodates the circumferential seal and at least one of a plurality of radially inwardly directed indentations, openings or another circumferential slot for receiving retention pins that pass radially inwardly through an interior wall of the valve housing. The retention pins fix the position of the completion plug within the valve housing after the completion plug is seated on the circumferential seat of the valve housing interior. The indentations, openings or additional circumferential slot for receiving the retention pins may be disposed between the circumferential seal and the distal surface of the completion plug.

In an embodiment, the gut rod of the insertion tool includes a threaded proximal end for threadably engaging the distal end of the threaded valve stem. The proximal end of the gut rod is disposed within the outer tube, which is coupled to the insertion rod but is free to rotate independently of the gut rod. As a result, the check valve actuator may be manually lined up with the check valve of the completion plug as the cartridge is moved proximally towards the pipe and more specifically, as the completion plug moves towards the circumferential seat. An alternative to this arrangement is to use an actuator rod that passes through a sealed orifice in the tapping machine or tapping machine housing that is aligned with the check valve. The operator can simply insert the actuator through the orifice and push it downward to open the check valve.

In an embodiment, the proximal end of the gut rod includes a female threaded hole for threadably receiving a male threaded distal end of the threaded valve stem.

In an embodiment, the normally-closed check valve is a spring-biased poppet valve.

In an embodiment, a completion plug is disclosed for a gate valve housing or a line stop fitting sealably connected to a pressurized pipe around an opening in the pipe. The completion plug comprises a cylindrical body comprising a distal surface that engages an insertion tool, a proximal surface that faces the pipe and a sidewall disposed between the proximal and distal surfaces of the completion plug. The cylindrical body accommodates a normally closed check valve that, when opened, provides communication between an opening in proximal surface and an opening in the distal surface of the cylindrical body. The sidewall includes a circumferential slot that accommodates a circumferential seal for providing a seal between circumferential slot and an interior surface of the gate valve housing or an interior surface of the line stop fitting. The opening in the distal surface provides access to the normally closed check valve by a check valve actuator for opening the normally closed check valve.

A method is disclosed for equalizing pressure above and below a gate valve cartridge contained within a valve housing that is in communication with an opening in a sidewall of a pipe. The method comprises:

providing a gate valve cartridge and installation assembly comprising a valve housing comprising a distal section connected to a proximal section, the proximal section of the valve housing sealably connected to the pipe around the opening in the pipe;

providing a cartridge comprising a gate comprising a distal end connected to a proximal end, a paddle connected to the proximal end of the gate, a threaded valve stem, a stem nut and a completion plug disposed opposite the gate from the paddle, the cartridge further comprising a valve stem channel extending proximally through the completion plug and distal end of the gate before terminating between the proximal and distal ends of the gate, the valve stem channel accommodating a stationary stem nut, the completion plug including a side wall with a circumferential slot for accommodating a circumferential seal, the valve housing being large enough to accommodate the gate with an annular space disposed between the gate and interior surface of the valve housing, and the distal section of the valve housing being large enough to accommodate the completion plug except at a circumferential seat disposed inside the valve housing, the circumferential seal of the completion plug engaging an interior surface of the valve housing distally (above) of the circumferential seat of the valve housing;

threadably connecting the threaded valve stem through the stem nut and into the valve stem channel, the threaded valve stem also including a distal end disposed distally of the completion plug;

coupling the distal end of the threaded valve stem to an insertion tool;

providing the completion plug with a normally-closed check valve, the check valve having an open distal end for receiving a check valve actuator and an open proximal end in communication with a fluid channel that extends radially outward from the check valve to a sidewall portion of the gate or completion plug or both disposed proximally of the circumferential seal;

moving the cartridge proximally until the proximal surface of the completion plug engages the circumferential seat of the valve housing; and aligning the check valve actuator with the check valve and opening the check valve with the check valve actuator before or during engagement of the circumferential seal of the completion plug with the interior surface of the valve housing to provide communication between proximal and distal sides of the circumferential seal of the completion plug.

Similarly, this disclosure reveals an improved completion plug for installation in a line stop fitting after a line stop has been withdrawn. The completion plug for the line stop fitting also comprises an outer circumferential slot for accommodating a circumferential seal. The completion plug also accommodates a normally-closed check valve. The check valve has an open distal end for receiving the check valve actuator and an open proximal end in communication with the water in the line stop fitting. The check valve actuator opens the check valve during installation of the completion plug in the line stop fitting, but the check valve remains closed after installation of the completion plug in the line stop fitting and after the completion plug is fixed in place at the distal section of the line stop fitting.

A method is disclosed for equalizing pressure above and below a completion plug while the completion plug is being installed into a line stop fitting that is in communication with an opening in a sidewall of a pipe. This method comprises:

providing a completion plug, the line stop fitting and an installation assembly, the line stop fitting comprising a distal end connected to a proximal end, the proximal end of the line stop fitting connected to the pipe around the opening in the pipe, and an interior diameter of the line stop fitting being large enough to accommodate the completion plug except at a circumferential seat disposed inside the line stop fitting;

the completion plug comprising an outer circumferential slot for accommodating a circumferential seal, the completion plug also accommodating a normally-closed check valve, the check valve having an open distal end for receiving a check valve actuator and a proximal end in communication with fluid in the pipe;

the completion plug additionally comprising a blind threaded hole centered on the distal face of the completion plug used for threadably coupling a completion plug insertion mandrel, upon which is affixed a check valve actuator;

aligning the check valve actuator with the check valve and opening the check valve to provide communication between proximal and distal sides completion plug; and pressing the completion plug proximally until the proximal surface of the completion plug engages the circumferential seat of the line stop fitting.

Other advantages, features and additional embodiments will be apparent from the following detailed description when read in conjunction with the attached drawings.

BRIEF DESCRIPTION OF THE DRAWINGS

For a more complete understanding of the disclosed methods and apparatuses, reference should be made to the embodiments illustrated in greater detail in the accompanying drawings, wherein.

The drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the embodiments illustrated herein.

DETAILED DESCRIPTION OF THE PRESENTLY PREFERRED EMBODIMENTS

Figure 1:
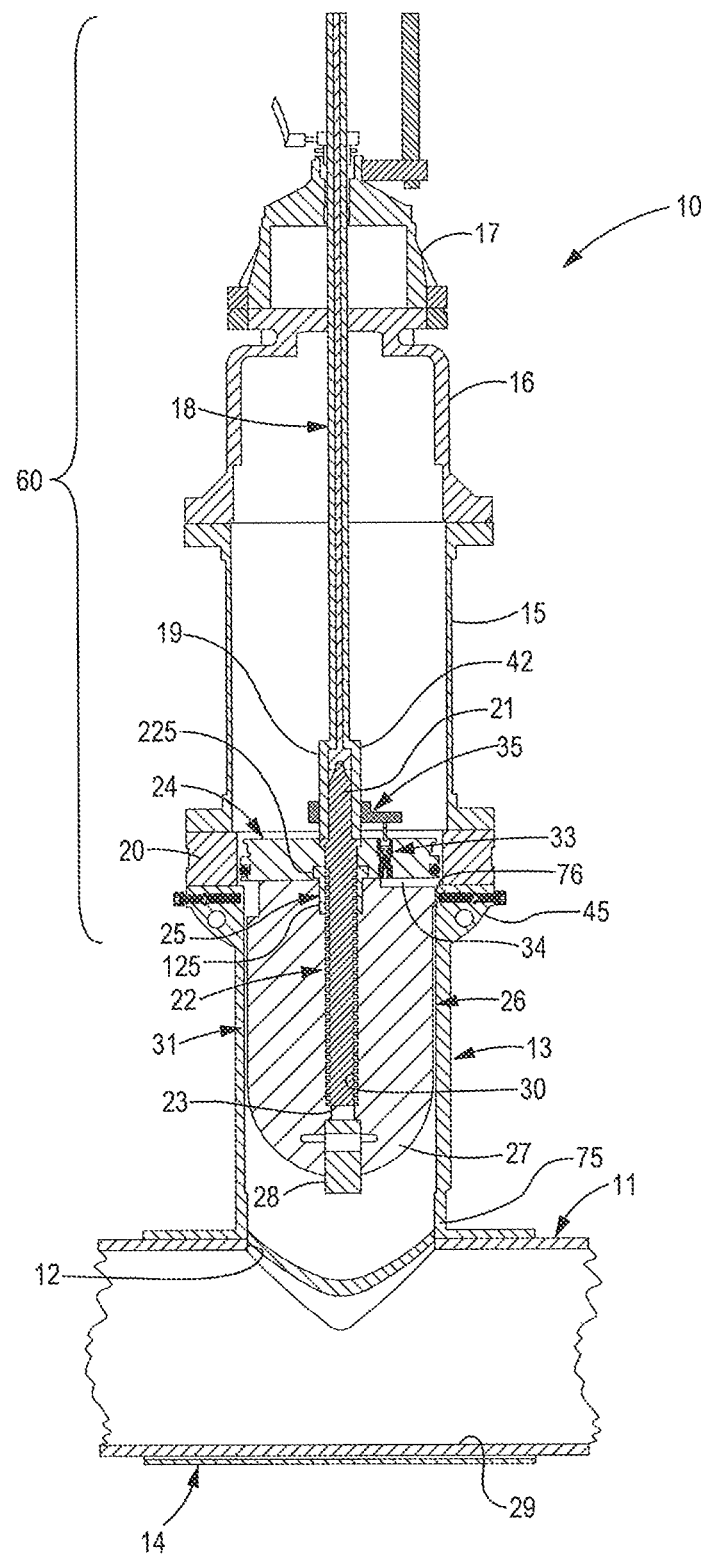
FIG. 1 is an elevational and sectional view of a gate valve cartridge, a valve housing and an installation assembly mounted on top of a horizontal pipe already having a hole cut through the top of the pipe.

FIG. 1 illustrates a gate valve cartridge and installation assembly 10 that is mounted onto a horizontal section of a pipe 11. A hole or opening 12 has previously been cut into the top surface of the pipe 11 using the valve housing 13 and saddle assembly 14 as described in the '843, and '779 patents cited above. The valve housing 13 sealably connects to the pipe 11 at its proximal end 75 using the saddle assembly 14. A temporary gate valve 20 is mounted on top of or at the distal end 76 of the valve housing 13 and an installation housing 15 is mounted on top of the temporary gate valve 20. For larger pipes, an adapter 16 is mounted on top of the installation housing 15 and between the installation housing 15 and a tapping machine 17. An insertion tool 18 sealably extends through the tapping machine 17, adapter 16 and installation housing 15 before its proximal end 19 is coupled to the distal end 21 of the threaded valve stem 22.

The threaded valve stem 22 is accommodated in a valve stem channel 30 that, as shown in FIG. 1, passes through the completion plug 24 and into the gate 26. The threaded valve stem 22 also includes a proximate end 23 which passes through the completion plug 24 and stem nut 25 before proceeding into the gate 26 and down towards the proximal end 27 of the gate 26. The gate 26 includes a recess for accommodating the main body 125 of the stem nut 25 while the completion plug 24 includes a recess for accommodating the flanged portion 225 of the stem nut 25. During operation, a paddle 28 disposed at the proximal end 27 of the gate 26 blocks flow through the pipe 11 when lowered down into the sealing engagement with the interior surface 29 of the pipe 11. As explained in the '779 patent, at col. 7, lines 20-64 and FIGS. 8-11, the valve housing 13 and a portion of the gate 26 may have non-circular cross-sections to prevent the gate 26 and paddle 28 from twisting as the paddle 28 should be perpendicular to the fluid flow through the pipe 11. After installation, the valve housing 13, cartridge 31 (completion plug 24, gate 26, threaded valve stem 22 and stem nut 25) and saddle assembly 14 typically become permanent fixtures on the pipe 11. In this case, the open distal end 76 of the valve housing 13 or the valve housing flange 45 is sealed with a cover plate (not shown).

Figure 1A:
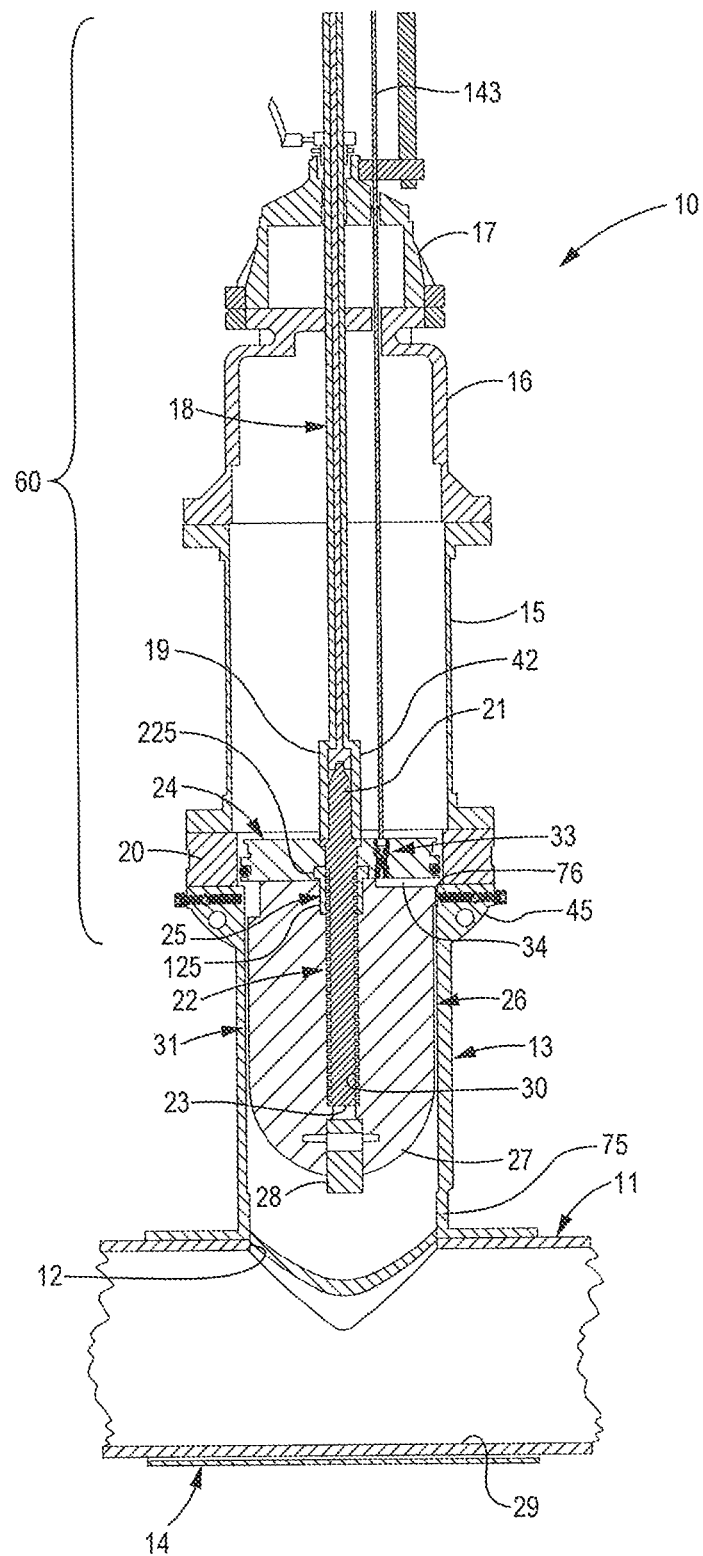
FIG. 1A is another elevational and sectional view of the combination shown in FIG. 1, but with an alternative means for activating the check valve disposed in the completion plug of the gate valve cartridge.

FIG. 1A illustrates the use of an actuator 143 to open the check valve 33 disposed in the completion plug 24. The function of the check valve 33 is described below.

Figure 2:
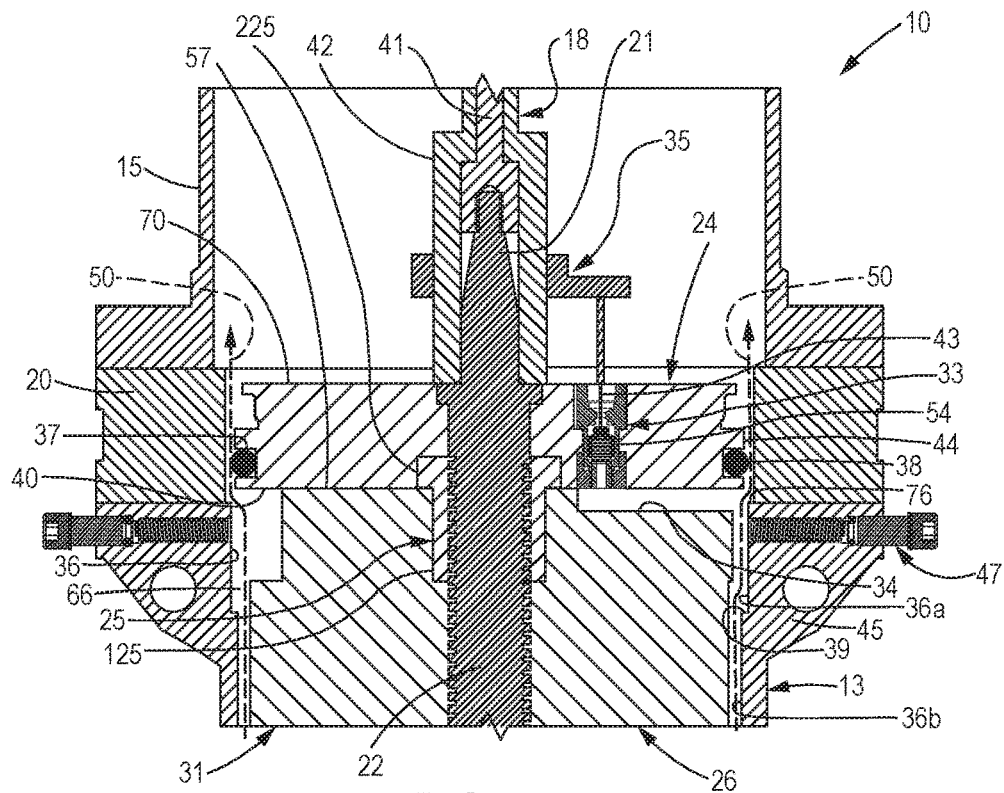
FIG. 2 is a partial sectional view of the distal ends of the valve housing and the gate valve cartridge, a temporary gate valve and the proximal ends of the installation housing and insertion tool, wherein the gate and completion plug of the gate valve cartridge have not been lowered far enough into the valve housing for the circumferential seal that surrounds the completion plug to engage the interior wall of the valve housing and, hence, phantom lines are used to illustrate the flow of water annularly in a distal direction past the gate and completion plug, through the temporary gate valve and into the installation housing.
Figure 3:
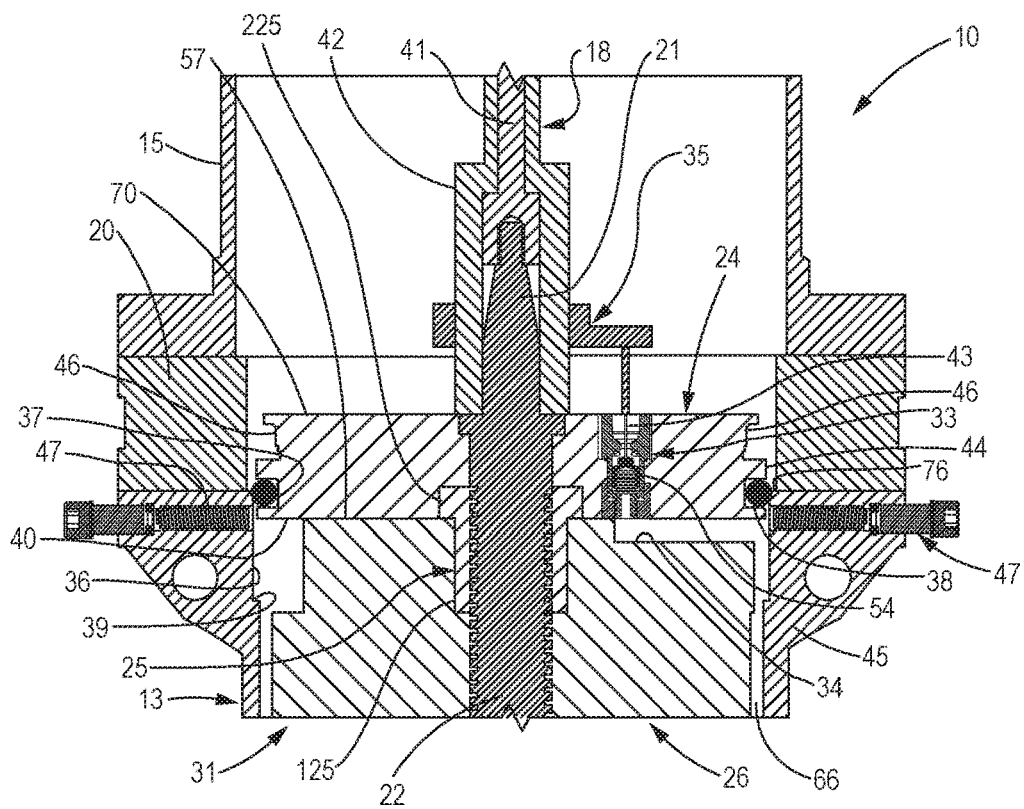
FIG. 3 is a partial sectional view similar to FIG. 2 but wherein the installation tool has been used to lower the gate and completion plug in the proximal direction (downward), so the circumferential seal of the completion plug has begun to engage and seal against the interior wall of the valve housing.

Referring to FIGS. 2 and 3, the completion plug 24 includes a circumferential slot 37 that accommodates a circumferential seal 38. The installation of the cartridge 31 into the valve housing 13 requires proximal (downward) movement of the cartridge 31. FIG. 2 illustrates a point during the installation before the circumferential seal 38 has engaged the interior surface 36 of the valve housing 13. Because the outer diameter or width of the gate 26 is smaller than the interior diameter or width of the valve housing 13, fluid from the pipe 11 (FIG. 1) is free to flow distally (upward) through the annulus 66 and past the cartridge 31 as indicated by the arrows 50. In an embodiment, the valve housing 13 includes a plurality of internal diameters 36a, 36b that are wider than the distal and proximal ends of the gate 26 thereby permitting fluid from the pipe 11 to migrate distally from the pipe 11 and annularly between the gate 26 and the interior surface 36 of the valve housing 13 and above the completion plug 24 before the circumferential seal 38 of the completion plug 24 is moved into sealing engagement with the interior surface 36 of the valve housing 13.

As shown in FIG. 3, the circumferential seal 38 has begun to engage the interior surface 36 of the valve housing 13 at its open distal end 76. Because the entire installation fixture 60 (temporary gate valve 20, installation housing 15, optional adapter 16, and tapping machine 17; see FIG. 1) are sealed to the atmosphere, the downward movement of the cartridge 31 from the position shown in FIG. 2 to the position shown in FIG. 3 creates a pressure differential across the circumferential seal 38. Specifically, a low-pressure zone is created above the circumferential seal 38 while the relatively high pressure in the pipe 11 is maintained below the circumferential seal 38. A few centimeters or inches of travel from the position shown in FIG. 2 to the position shown in FIG. 3 results in a pressure differential strong enough so the cartridge 31 can no longer be advanced downward or proximally by hand. In the past, external pressure equalization sources were required to move the cartridge 31 proximally until the proximal surface 40 of the completion plug engages the circumferential seat 39.

Figure 4:
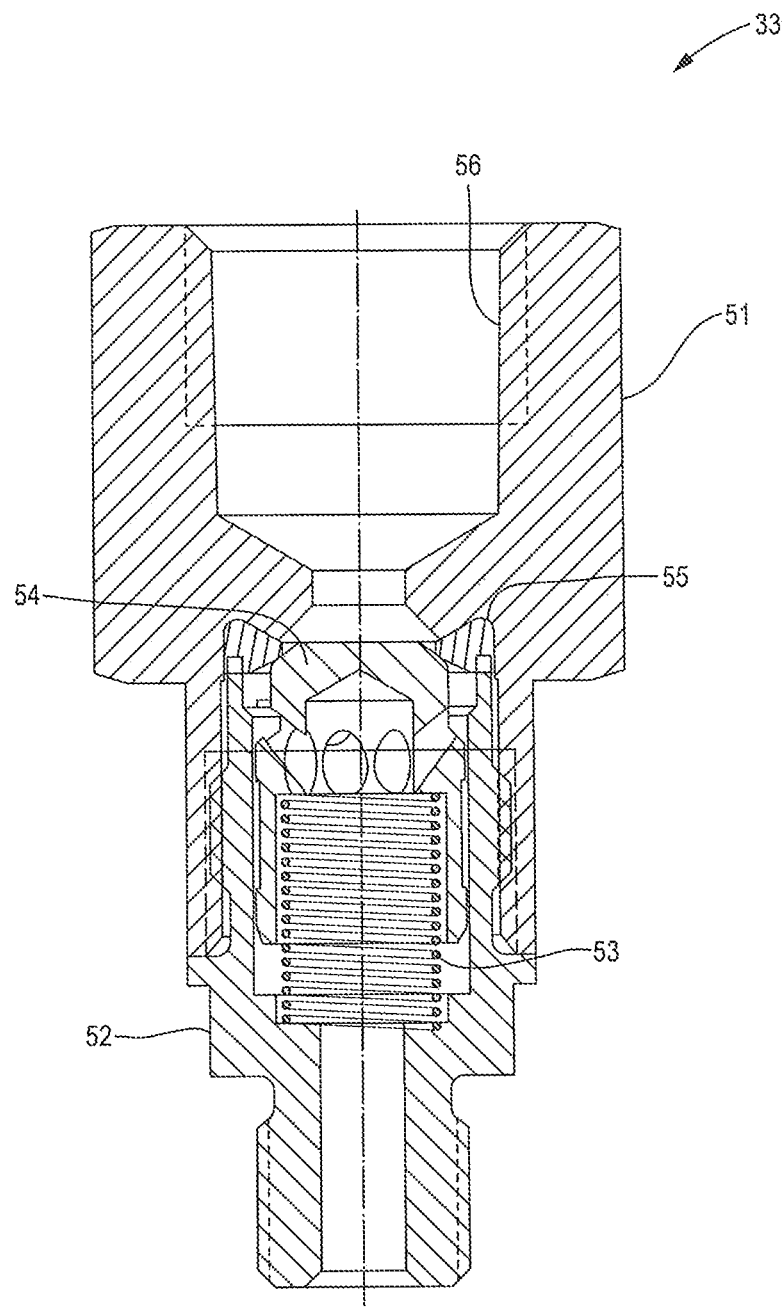
FIG. 4 is an elevational and sectional view of the check valve disposed in the completion plug.

However, as shown in FIGS. 1-3 and 5-7, the completion plug 24 is equipped with a check valve 33. The check valve 33 is in communication with at least one fluid communicating channel 34 disposed at the proximal surface 40 of the completion plug 24 and/or distal surface 57 of the gate 26. The check valve 33, as described below in connection with FIG. 4, is biased into a closed position (or is a "normally-closed" check valve). However, as also shown below in connection with FIGS. 2 and 3, the insertion tool 18 may be equipped with a check valve adapter 35 and check valve actuator 43 that opens the check valve 33 during the lowering of the completion plug 24 and the gate 26 into the position in the valve housing 13 shown in FIG. 7. As shown in FIGS. 1A and 7A, the actuator 43 for opening the check valve 33 may be disposed at a proximal end of a rod 143 that sealably passes through the tapping machine 17.

Figure 7:
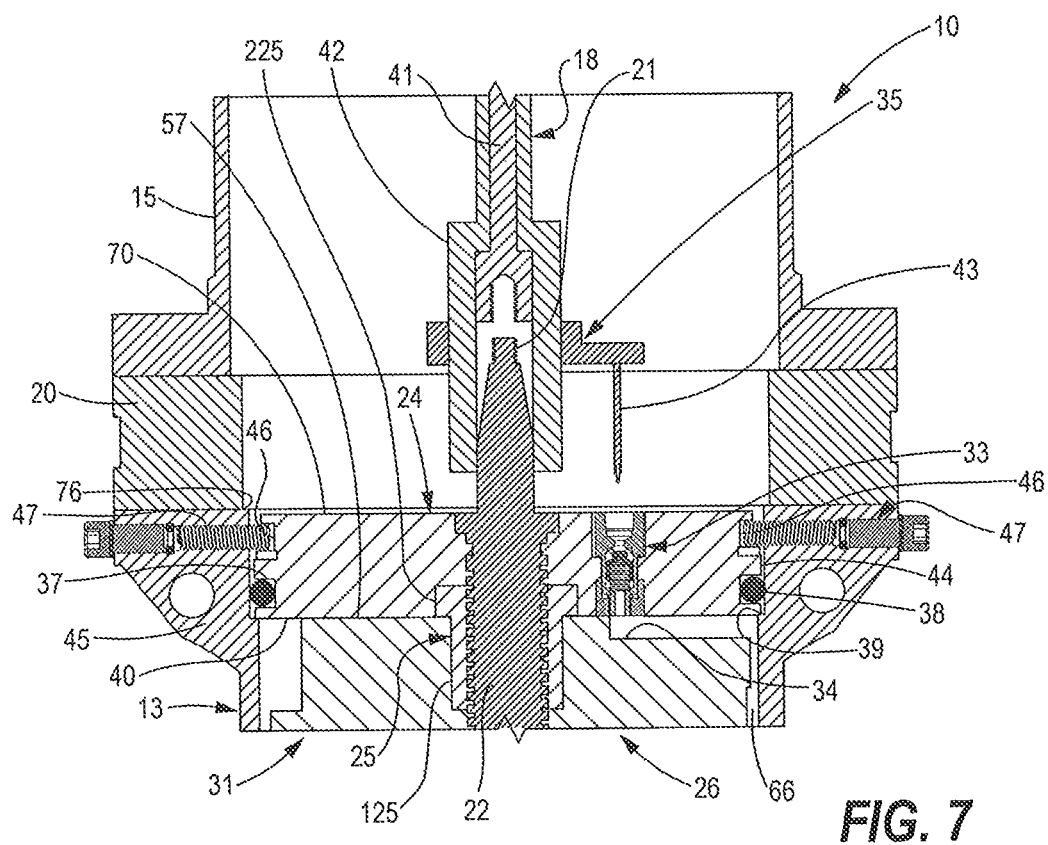
FIG. 7 is another partial sectional view similar to FIGS. 2-3 but illustrating the completion plug seated on the circumferential seat of the valve housing and the lifting of the insertion tool in the distal direction thereby closing the check valve.

In the position shown in FIG. 2, the insertion tool 18 is installed on the distal end 21 of the threaded valve stem 22. The insertion tool 18 may include an inner gut rod 41 and an outer tube 42 at its proximal end 19 that is coupled to the inner gut rod 41 but is free to rotate independently thereof. The outer tube 42 may be coupled to a check valve adapter 35 which is connected to or includes a check valve actuator 43. Installation of the inner gut rod 41 and outer tube 42 over the distal end 21 of the threaded valve stem 22, along with proper alignment of the check valve adapter 35 causes the downwardly extending check valve actuator 43 to engage and move the spring-biased poppet 54 proximally to open the check valve 33. The check valve 33 remains open as the gate 26 and completion plug 24 of the cartridge 31 are pressed proximally or downward through the positions shown in FIGS. 2 and 3 and until the cartridge 31 reaches the position where the proximal surface 40 of the completion plug 24 engages the circumferential seat 39 as shown in FIG. 7. To secure the cartridge 31 within the valve housing 13 as a permanent installation, in the position shown in FIG. 7, holes, indentations or at least one circumferential slot 46 disposed in the sidewall 44 of the completion plug 24 are in alignment with the retention pins 47, which are used to sealably lock the completion plug 24 in place. Details of the design and operation of the retention pins 47 are discussed below in connection with FIGS. 8-9. In the position shown in FIG. 7, the insertion tool 18 may now be removed and the check valve 33 closed with the circumferential seal 38 and closed check valve 33 preventing distal or upward flow of water from the pipe 11. Because the circumferential seal 38 and closed check valve 33 prevent distal or upward flow through the annulus 66, the temporary gate valve 20, installation housing 15 and insertion tool 18 may be removed and the open distal end 76 of the valve housing 13 may be covered with a cover plate (not shown). FIG. 7A illustrates the alternative actuator 143 shown in FIG. 1A.

Figure 5:
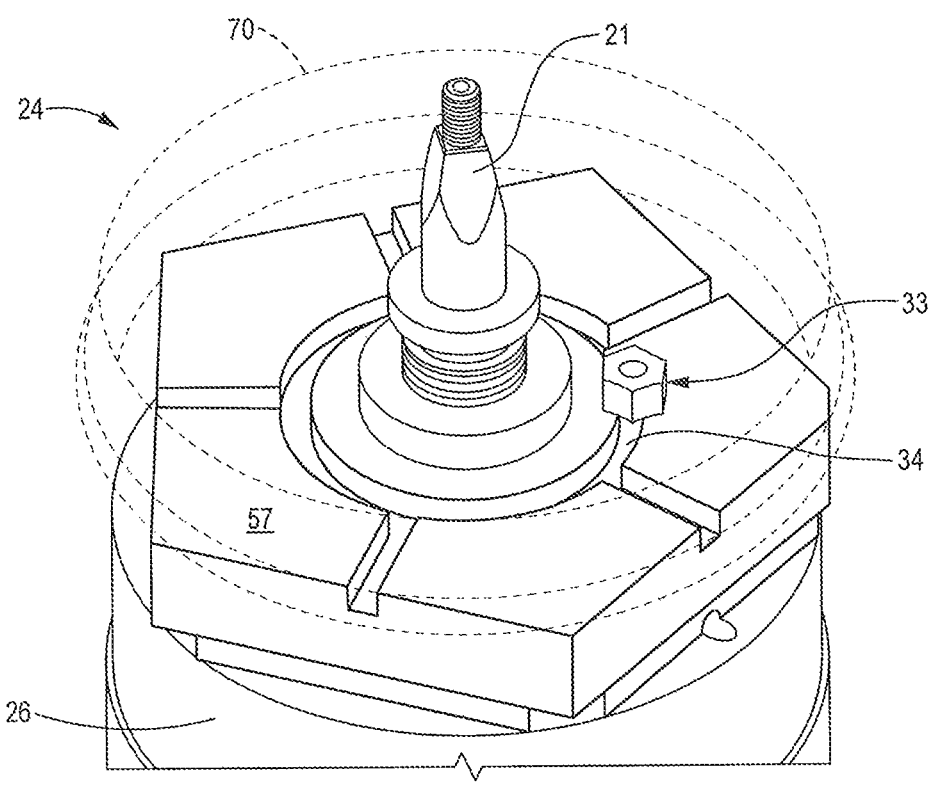
FIG. 5 is a perspective view of a distal end of the gate with the completion plug shown in phantom thereby illustrating the location of the check valve in the completion plug and over fluid communicating channels that provide communication between the check valve and the annulus between the gate and the interior wall of the valve housing shown in FIGS. 2-3.

FIG. 4 illustrates one embodiment of the check valve 33. In the embodiment shown, the check valve 33 is a normally closed poppet style check valve 33 with a larger upper or distal hex-shaped cap 51 threadably coupled to a lower or proximal body 52. A spring 53, poppet 54 and valve seat 55 are trapped between the distal hex-shaped cap 51 and the proximal body 52. The distal hex-shaped cap 51 provides a wide opening 56 for the check valve actuator 43 (FIGS. 2-3 and 7), 143 (FIG. 7A), 243 (FIGS. 10-11) to extend through and push the poppet 54 against the spring 53 thereby opening the check valve 33. The check valve 33 may be disposed partially in the completion plug 24 and partially in the gate 26 or entirely within the completion plug 24, as shown in FIGS. 2-3, 6-7A and 10-11. As shown in FIG. 5 the check valve 33 may be disposed over a fluid communicating channel 34 disposed in the distal surface 57 of the gate 26 that includes radial segments to establish fluid communication between the annulus 66 and the check valve 33.

Figure 6:
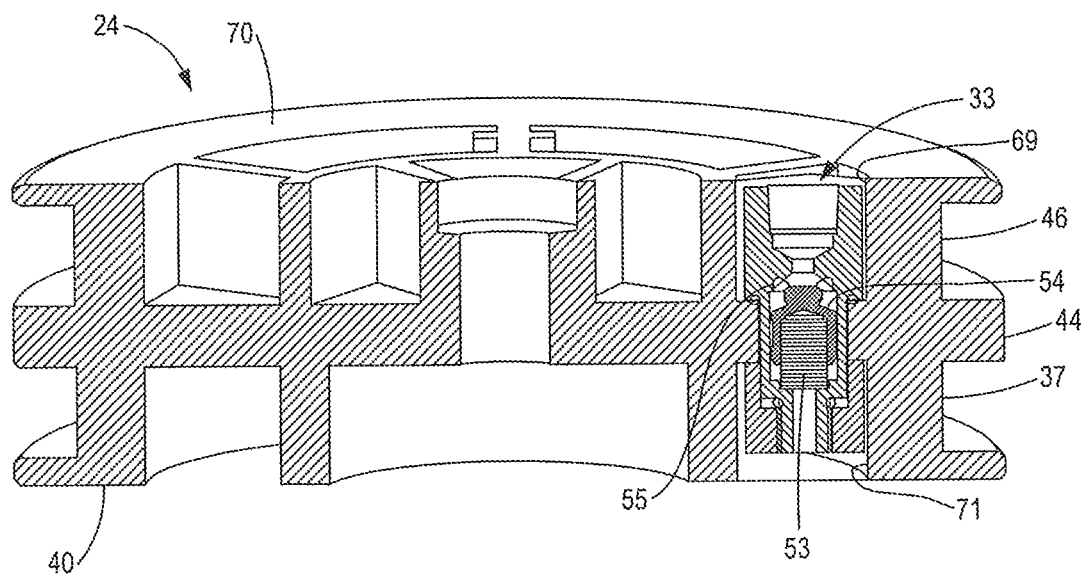
FIG. 6 is a sectional view of a disclosed completion plug and check valve.
Figure 7A:
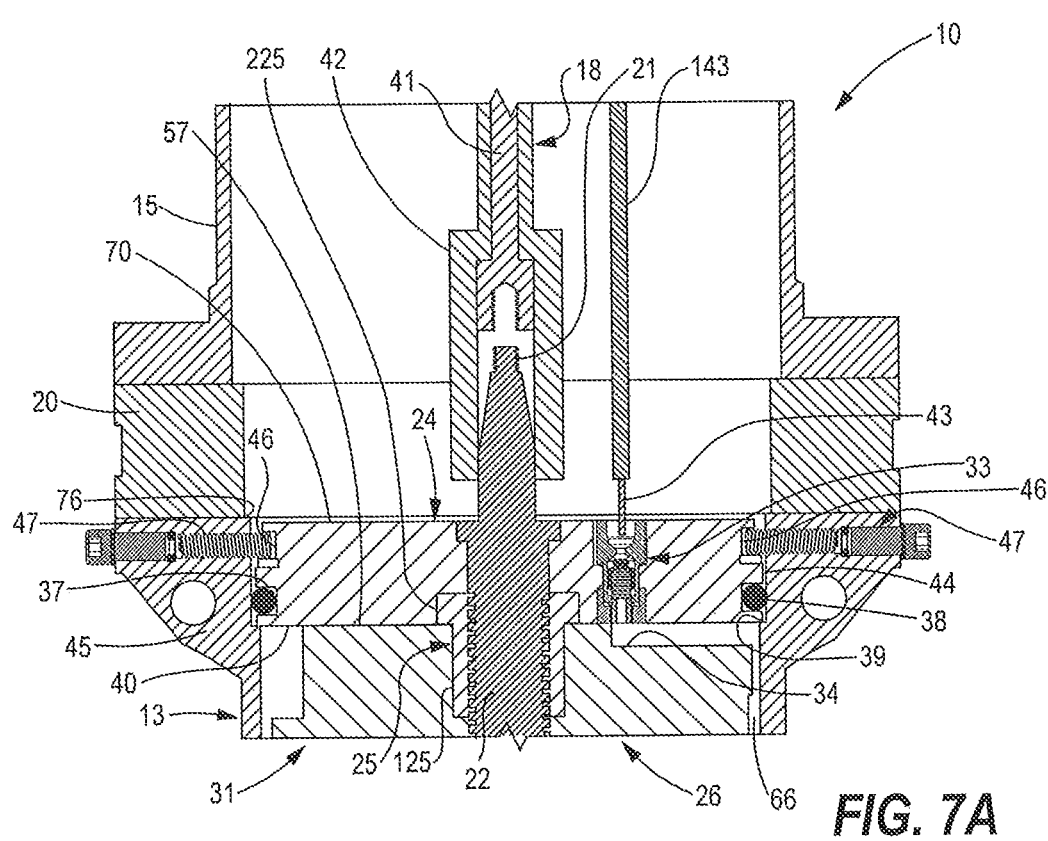
FIG. 7A is another partial sectional view like FIG. 7 but showing the alternative means for opening the check valve disposed in the completion plug that is illustrated in FIG. 1A.

In the embodiment illustrated in FIG. 6, the check valve 33 is disposed entirely within the cylindrical body 124 of the completion plug 24 and between the opening 69 in the distal surface 70 of the cylindrical body 124 and the opening 71 in the proximal surface 40 of the cylindrical body 124. Further, it will be noted that the fluid communicating channel(s) 34 may be formed within the completion plug 24, on the distal surface 57 of the gate 26 (see FIG. 5) or a combination of both the distal surface 57 of the gate 26 and the proximal surface 40 of the completion plug 24.

FIG. 7 illustrates the raising of the insertion tool 18 and disengagement of the check valve actuator 43 from the check valve 33 thereby closing the poppet 54 against the seat 55 under the bias of the spring 53 (FIG. 4). The completion plug 24 and the gate 26 have been lowered so that the slot 46 (or indentation(s) or hole(s)) can receive the retention pins 47 and the proximal surface 40 of the completion plug 24 engages the circumferential seat 39 of the valve housing 13. After the insertion tool 18 and temporary gate valve 20 are removed, a cover plate (not shown) may be installed at the distal end 76 of the valve housing 13. FIGS. 1A and 7A illustrate the use of the separate actuator 143 as opposed to the adapter 35 and actuator 43 combination coupled to the outer tube 42 of the insertion tool 18.

Figure 8:
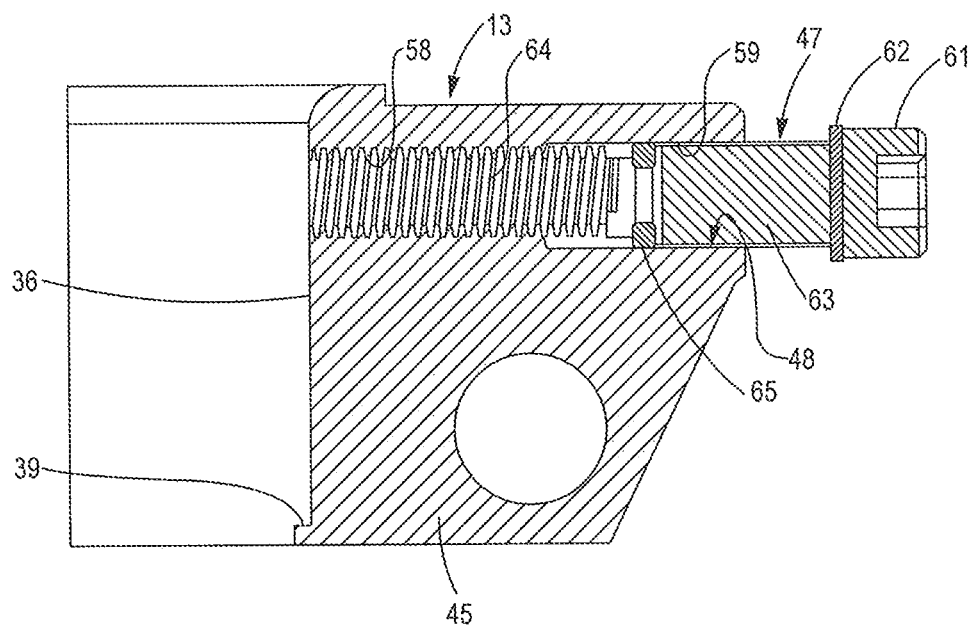
FIG. 8 is a partial sectional view of a valve housing flange or line stop fitting flange showing a disclosed retention pin in a retracted position.
Figure 9:
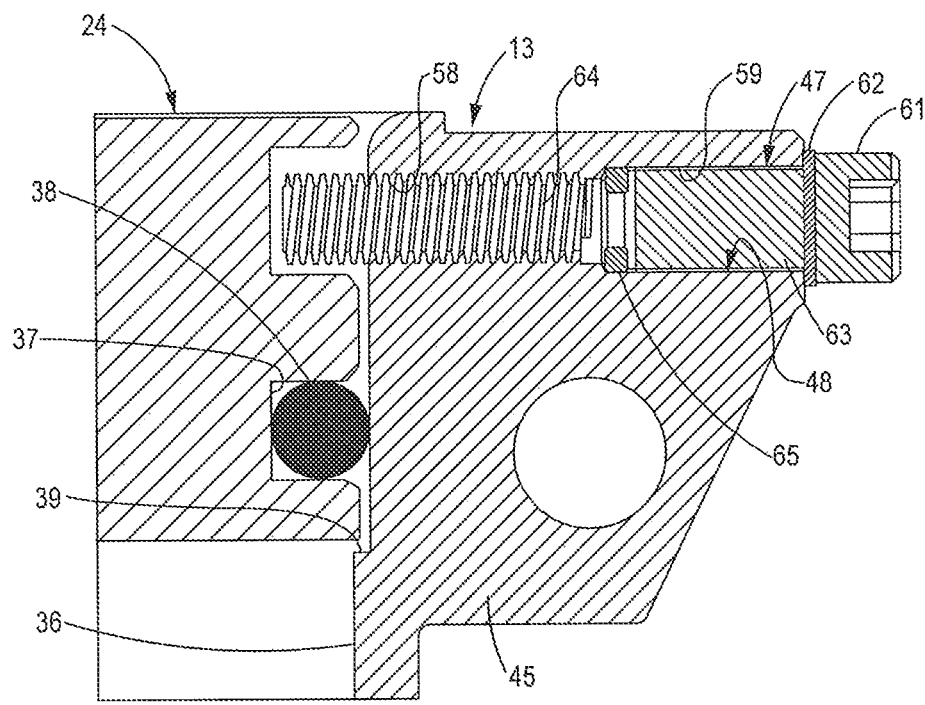
FIG. 9 is another partial sectional view of the valve housing flange or line stop fitting flange showing the retention pin in an extended position for holding the completion plug in place.

FIGS. 8-9 illustrate one of the retention pins 47 disposed within an internal bore 48 formed in the flange 45 disposed at the distal end 76 of the valve housing 13. FIG. 8 illustrates the retention pin 47 in a retracted position for installation of the cartridge 31 while FIG. 9 illustrates the retention pin 47 in an extended position for locking the completion plug 24 in place for operation of the cartridge 31. Each internal bore 48 includes a threaded section 58 and a non-threaded section 59. The retention pins 47 each include a head 61, a gasket 62, a non-threaded shaft portion 63, a threaded shaft portion 64 and a seal member or O-ring 65 disposed between the non-threaded shaft portion 63 and the threaded shaft portion 64. The O-ring 65 sealably engages the non-threaded section 59 of the internal bore 48 in both the retracted and extended positions and prevents water from passing from the annulus 66 and through the internal bore 48 during the installation process and subsequent operation of the cartridge 31.

Without a proper seal between the retention pins 47 and internal bores 48 of the flange 45, the flow through the check valve 33 would not be sufficient to equalize the pressure above and below the circumferential seal 38. Further, the heads 61 of the retention pins 47 should be wider than the internal bores 48 so the gaskets 62 are trapped between the flange 45 and the heads 61 in the extended position shown in FIG. 9. Engagement of the gasket 62 against the flange 45 as shown in FIG. 9 serves as a signal to the installer to stop tightening the retention pin 47. The length of each retention pin 47 is defined so that the proper amount of threaded shaft portion 64 can extend radially inwardly to retain the completion plug 24 when the retention pin 47 is tightened to the flange 45. The retention pins 47 and completion plug 24 should be designed so the completion plug 24 is centered within the distal end 76 of the valve housing 13 in the retained position shown in FIG. 9.

Figure 10:
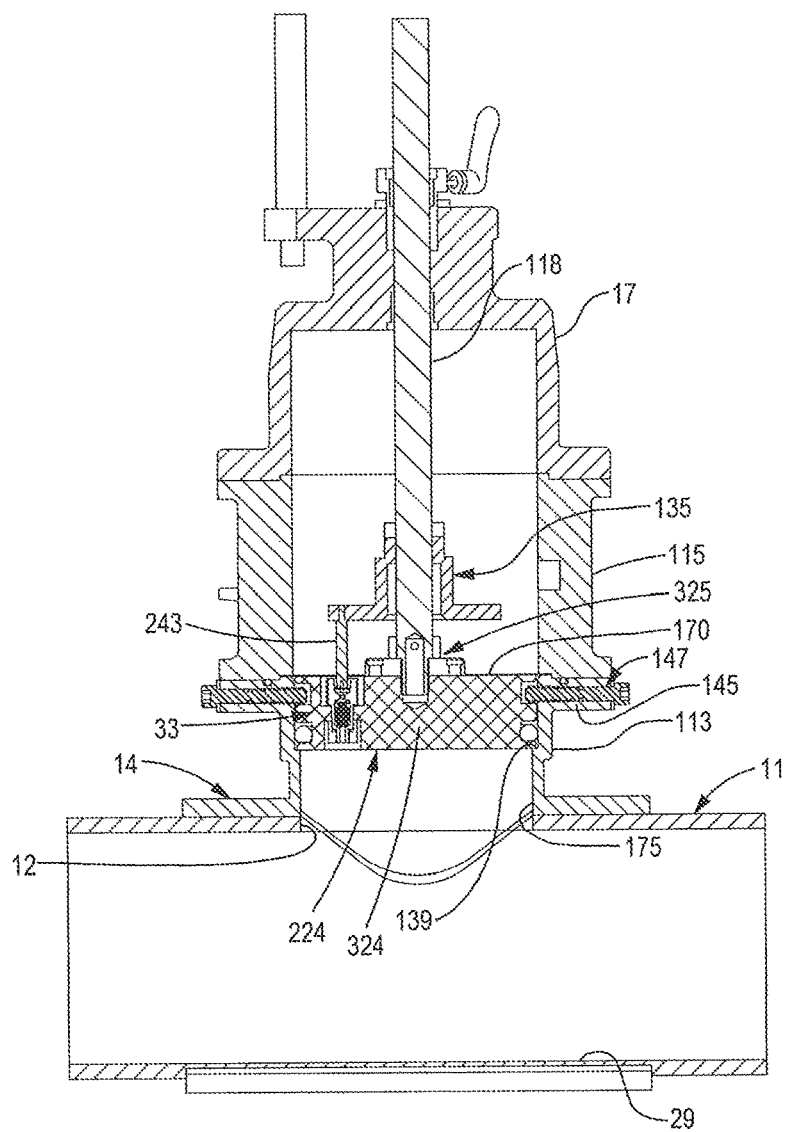
FIG. 10 is an elevational and sectional view of a line stop fitting, a completion plug and an installation assembly mounted on top of a horizontal pipe already having a hole cut through the top of the pipe.
Figure 11:
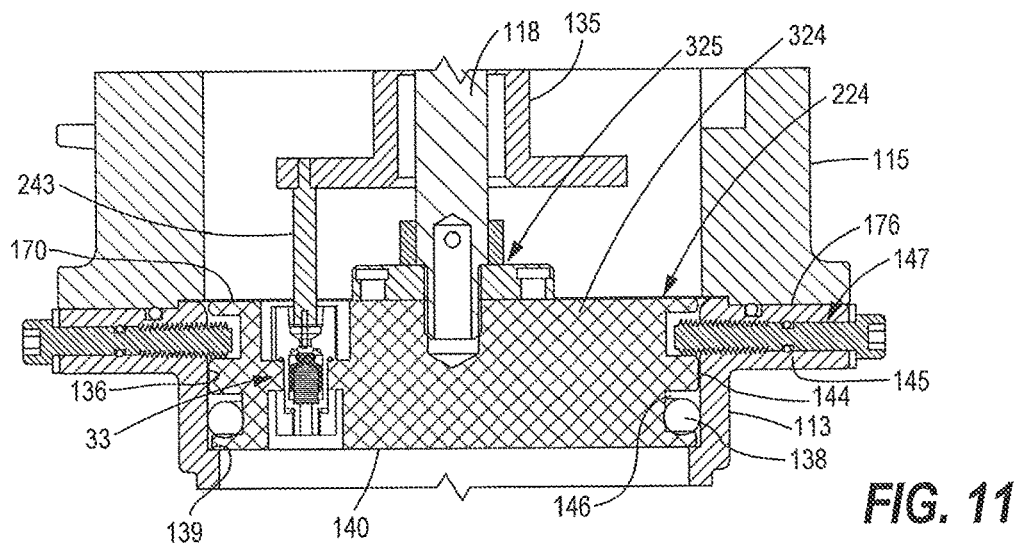
FIG. 11 is an enlarged sectional view of the completion plug and partial sectional view of the line stop fitting and installation housing shown in FIG. 11.

Finally, FIGS. 10-11 illustrate a completion plug 224 that is being installed into a line stop fitting 113 after a line stop has been removed from the pipe 11. The line stop fitting 113 includes a proximal end 175 that is mounted onto the pipe 11 over an opening 12 in the pipe 11. A distal end 176 of the line stop fitting 113 connects to a proximal end of a temporary gate valve 115, which has a distal end that connects to a tapping machine 17. The completion plug 224 includes a generally cylindrical body 324 with a proximal surface 140, a distal surface 170 and a sidewall 144 disposed therebetween. The sidewall 144 includes a slot 146 for accommodating a circumferential seal 138 that provides a seal between the interior surface 136 of the line stop fitting 113 and the slot 146 or sidewall 144 of the completion plug 224. To move the completion plug 224 proximally far enough so that its proximal surface 140 rests on the circumferential seat 139 of the line stop fitting 113, the water pressure above and below the seal 138 of the completion plug 224 (i.e., distally and proximally) must be equalized. Thus, like the completion plug 224 described above in connection with FIGS. 1-9, the completion plug 224 includes a normally-closed check valve 33 that is opened by an actuator 243 attached to a completion plug insertion mandrel or tool 118 via an adapter 135 as shown in FIGS. 10-11. The mandrel 118 is also utilized to move the completion plug 224 proximally into the position shown in FIGS. 10-11 with its proximal surface 140 resting on the circumferential seat 139 Like the valve housing 13 discussed above, the line stop fitting 113 includes a flange 145 at its distal end 176 and retention pins 147 that pass through the flange 145 and lock the completion plug 224 in place with its proximal surface 140 resting on the seat 139 disposed inside the line stop fitting 113.

While only certain embodiments have been set forth, alternatives and modifications will be apparent from the above description to those skilled in the art. Further, aspects of different embodiments can be combined or substituted by one another. These and other alternatives are considered equivalents and within the spirit and scope of this disclosure and the appended claims.

What is claimed:

1. A combination comprising:
  a cartridge, a valve housing and an installation assembly for installing the valve housing and the cartridge on a pipe without interrupting flow through the pipe during installation and wherein a portion of the cartridge can be moved from the valve housing into the pipe to block flow through the pipe, the combination comprising:
  the valve housing comprising a distal end connected to a proximal end, the proximal end of the valve housing sealably mounted to the pipe and surrounding an opening in the pipe,
  the cartridge comprising a gate, a completion plug, a stem nut, a threaded valve stem and a paddle, the gate comprising a distal end connected to a proximal end, the proximal end of the gate coupled to the paddle, the stem nut being threaded and fixedly connected to the gate, the completion plug disposed opposite the gate from the paddle, the completion plug and gate defining a valve stem channel in axial alignment with the stem nut, the valve stem channel accommodating the threaded valve stem as it passes through the completion plug and threadably through the stem nut,
  the completion plug comprising an outer circumferential slot for accommodating a circumferential seal, the completion plug also accommodating a normally-closed check valve, the check valve having an open distal end for receiving a check valve actuator and an open proximal end in communication with a fluid channel that extends radially outward from the check valve to an annulus disposed between the gate and an interior surface of the valve housing and proximal to the circumferential seal;
  wherein the distal end of the valve housing has an interior surface with a diameter wide enough to accommodate the completion plug with the circumferential seal compressively sealing between the circumferential slot of the completion plug and the interior surface of the valve housing; and
  wherein the valve housing includes a plurality of internal diameters that are wider than the distal and proximal ends of the gate thereby permitting fluid from the pipe to migrate distally from the pipe and annularly between the gate and the interior surface of the valve housing and past the completion plug before the circumferential seal is moved into engagement with the interior surface of the valve housing and before the normally-closed check valve is opened.

2. The combination of claim 1 wherein the installation assembly comprises an insertion tool that engages a distal end of the threaded valve stem, the check valve actuator is coupled to the insertion tool.

3. The combination of claim 1 wherein the installation assembly comprises a sealed orifice through which a check valve actuator rod may sealably pass through in alignment with the check valve.

4. The combination of claim 1 wherein the threaded valve stem has a proximal end disposed in the valve stem channel and a distal end disposed distally of the completion plug, the distal end of the threaded valve stem for engagement with an insertion tool, the insertion tool further comprising an outer tube coupled to the check valve actuator.

5. The combination of claim 1 wherein the valve housing includes a circumferential seat disposed between the distal and proximal ends of the valve housing, whereby proximal movement of the cartridge towards the pipe causes a proximal end of the completion plug to engage the circumferential seat and stop further proximal movement of the completion plug.

6. The combination of claim 5 wherein the completion plug includes a proximal surface that engages the distal end of the gate before the proximal surface of the completion plug engages the circumferential seat of the valve housing, and the proximal surface of the completion plug forms the fluid channel with the distal end of the gate, the completion plug also including a distal surface that faces away from the gate and a sidewall portion disposed between the proximal and distal surfaces of the completion plug, the sidewall portion including the circumferential slot that accommodates the circumferential seal and at least one slot for receiving retention pins that pass radially inwardly through the interior surface of the valve housing, the retention pins fixing a position of the completion plug within the valve housing with the proximal surface of the completion plug resting on the circumferential seat, the at least one slot for receiving the retention pins disposed between the circumferential seal and the distal surface of the completion plug.

7. The combination of claim 1 wherein the distal end of the valve housing connects to a valve housing flange that extends radially outwardly from the distal end of the valve housing, the flange including a plurality of internal bores, each internal bore accommodating one of a plurality of retention pins, each internal bore including an outer non-threaded section in axial alignment with an inner threaded section, each retention pin including a head connected to a non-threaded shaft portion disposed between the head and a threaded shaft portion, each retention pin further comprising a groove disposed between the threaded and non-threaded shaft portions, the groove accommodating an O-ring that provides a seal between the retention pin and non-threaded section of its respective internal bore.

8. The combination of claim 7 wherein each head of each retention pin has a diameter wider than a diameter of its respective non-threaded section of its respective internal bore.

9. The combination of claim 1 wherein the normally-closed check valve is a spring-biased poppet valve.

10. The combination of claim 1 wherein a distal end of the gate comprises a plurality of fluid channels providing communication from an annular space between the gate and the valve housing to the check valve.

11. A combination comprising:
a cartridge, a valve housing and an installation assembly for installing the valve housing and the cartridge on a pipe without interrupting flow through the pipe during installation and wherein a portion of the cartridge can be moved from the valve housing into the pipe to block flow through the pipe, the combination comprising:
the valve housing comprising a distal end connected to a proximal end, the proximal end of the valve housing sealably mounted to the pipe and surrounding an opening in the pipe,
the cartridge comprising a gate, a completion plug, a stem nut, a threaded valve stem and a paddle, the gate comprising a distal end connected to a proximal end, the proximal end of the gate coupled to the paddle, the stem nut being threaded and fixedly connected to the gate, the completion plug disposed opposite the gate from the paddle, the completion plug and gate defining a valve stem channel in axial alignment with the stem nut, the valve stem channel accommodating the threaded valve stem as it passes through the completion plug and threadably through the stem nut, and
the completion plug comprising an outer circumferential slot for accommodating a circumferential seal, the completion plug also accommodating a normally-closed check valve, the check valve having an open distal end for receiving a check valve actuator and an open proximal end in communication with a plurality of fluid channels defined by the distal end of the gate that extend radially outward from the check valve to an annulus disposed between the gate and an interior surface of the valve housing and proximal to the circumferential seal.

12. The combination of claim 11 wherein the installation assembly comprises an insertion tool that engages a distal end of the threaded valve stem, the check valve actuator is coupled to the insertion tool.

13. The combination of claim 11 wherein the installation assembly comprises a sealed orifice through which a check valve actuator rod may sealably pass through in alignment with the check valve.

14. The combination of claim 11 wherein the threaded valve stem has a proximal end disposed in the valve stem channel and a distal end disposed distally of the completion plug, the distal end of the threaded valve stem for engagement with an insertion tool, the insertion tool further comprising an outer tube coupled to the check valve actuator.

15. The combination of claim 11 wherein the normally-closed check valve is a spring-biased poppet valve.

16. A combination comprising:
a gate valve cartridge, a gate valve housing and an installation assembly for installing the gate valve housing and the gate valve cartridge on a pipe without interrupting flow through the pipe during installation and wherein a portion of the gate valve cartridge can be moved from the gate valve housing into the pipe to block flow through the pipe, the combination comprising:
the valve housing comprising a distal end connected to a proximal end, the proximal end of the valve housing sealably mounted to the pipe and surrounding an opening in the pipe,
the cartridge comprising a gate, a completion plug, a stem nut, a threaded valve stem and a paddle, the gate comprising a distal end connected to a proximal end, the proximal end of the gate coupled to the paddle, the stem nut being threaded and fixedly connected to the gate, the completion plug disposed opposite the gate from the paddle, the completion plug and gate defining a valve stem channel in axial alignment with the stem nut, the valve stem channel accommodating the threaded valve stem as it passes through the completion plug and threadably through the stem nut,
the completion plug comprising an outer circumferential slot for accommodating a circumferential seal, the completion plug also accommodating a normally-closed check valve, the check valve having an open distal end for receiving a check valve actuator and an open proximal end in communication with a fluid channel that extends radially outward from the check valve to an annulus disposed between the gate and an interior surface of the valve housing and proximal to the circumferential seal,
wherein the distal end of the valve housing connects to a valve housing flange that extends radially outwardly from the distal end of the valve housing, the flange including a plurality of internal bores, each internal bore accommodating one of a plurality of retention pins, each internal bore including an outer non-threaded section in axial alignment with an inner threaded section, each retention pin including a head connected to a non-threaded shaft portion disposed between the head and a threaded shaft portion, each retention pin further comprising a groove disposed between the threaded and non-threaded shaft portions, the groove accommodating an 0-ring that provides a seal between the retention pin and non-threaded section of its respective internal bore.

17. The combination of claim 16 wherein the installation assembly comprises an insertion tool that engages a distal end of the threaded valve stem, the check valve actuator is coupled to the insertion tool.

18. The combination of claim 16 wherein the installation assembly comprises a sealed orifice through which a check valve actuator rod may sealably pass through in alignment with the check valve.

19. The combination of claim 16 wherein the threaded valve stem has a proximal end disposed in the valve stem channel and a distal end disposed distally of the completion plug, the distal end of the threaded valve stem for engagement with an insertion tool, the insertion tool further comprising an outer tube coupled to the check valve actuator.

20. The combination of claim 16 wherein the normally-closed check valve is a spring-biased poppet valve.

* * * * *